(12) United States Patent
Stroebel

(10) Patent No.: US 11,299,204 B2
(45) Date of Patent: Apr. 12, 2022

(54) CONTROL UNIT AND METHOD FOR DETERMINING A TRAJECTORY FOR A REVERSING ASSISTANCE SYSTEM

(71) Applicant: Bayerische Motoren Werke Aktiengesellschaft, Munich (DE)

(72) Inventor: Michael Stroebel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 253 days.

(21) Appl. No.: 16/400,166

(22) Filed: May 1, 2019

(65) Prior Publication Data

US 2019/0256141 A1    Aug. 22, 2019

Related U.S. Application Data

(63) Continuation of application No. PCT/EP2017/081544, filed on Dec. 5, 2017.

(30) Foreign Application Priority Data

Jan. 9, 2017    (DE) .................... 10 2017 200 219.0

(51) Int. Cl.
*B62D 15/02* (2006.01)

(52) U.S. Cl.
CPC ....... *B62D 15/028* (2013.01); *B62D 15/0285* (2013.01)

(58) Field of Classification Search
CPC .............. B62D 15/0285; B60W 30/06; B60W 30/18036; B60W 30/18045
See application file for complete search history.

(56) References Cited

U.S. PATENT DOCUMENTS

| 2015/0203111 A1* | 7/2015 | Bonnet | B62D 15/027 701/25 |
| 2018/0136666 A1* | 5/2018 | Max | G01C 21/3819 |

FOREIGN PATENT DOCUMENTS

| DE | 10 2010 030 208 A1 | 12/2011 |
| DE | 10 2010 049 585 A1 | 4/2012 |
| DE | 10 2014 220 144 A1 | 4/2016 |

OTHER PUBLICATIONS

Translation of DE 102010030208, to Muelller et al. (Year: 2010).*

(Continued)

*Primary Examiner* — Kenneth J Malkowski
(74) *Attorney, Agent, or Firm* — Crowell & Moring LLP

(57) ABSTRACT

A control unit for a reversing assistance system of a vehicle is configured to determine and to store reference data in relation to a first forward travel of the vehicle, wherein the reference data indicate a reference trajectory of the vehicle for the first forward travel from an initial position as far as a first end position. In addition, the control unit is configured to detect that the vehicle begins a new, second forward travel at an intermediate position, which lies between the initial position and the first end position on the reference trajectory. The control unit is further configured to determine reference data in relation to the second forward travel of the vehicle, wherein the reference data indicate the reference trajectory of the vehicle for the second forward travel, starting from the intermediate position. The control unit is also configured to connect the reference data relating to the reference trajectory of the second forward travel, starting from the intermediate position, with the reference data relating to the reference trajectory of the first forward travel from the initial position as far as the intermediate position, in order to provide a coherent reference trajectory for assisted reversing.

12 Claims, 2 Drawing Sheets

(56) References Cited

OTHER PUBLICATIONS

International Search Report (PCT/ISA/210) issued in PCT Application No. PCT/EP2017/081544 dated Feb. 13, 2018 with English translation (four (4) pages).
German-language Written Opinion (PCT/ISA/237) issued in PCT Application No. PCT/EP2017/081544 dated Feb. 13, 2018 with English translation (14 pages).
German-language Search Report issued in counterpart German Application No. 102017200219.0 dated Sep. 28, 2017 with machine translation (15 pages).

* cited by examiner

CONTROL UNIT AND METHOD FOR DETERMINING A TRAJECTORY FOR A REVERSING ASSISTANCE SYSTEM

CROSS REFERENCE TO RELATED APPLICATIONS

This application is a continuation of PCT International Application No. PCT/EP2017/081544, filed Dec. 5, 2017, which claims priority under 35 U.S.C. § 119 from German Patent Application No. 10 2017 200 219.0, filed Jan. 9, 2017, the entire disclosures of which are herein expressly incorporated by reference.

BACKGROUND AND SUMMARY OF THE INVENTION

The invention relates to a method and a corresponding control unit for determining a trajectory for a reversing assistance function of a multitrack motor vehicle.

A vehicle, in particular a road motor vehicle, can comprise one or more driver assistance systems, DASs, in which automatic transverse guidance of the vehicle is effected. By way of example, what is known as a reversing assistance system allows the vehicle to remember a trajectory on which the vehicle entered a particular parking space. The reversing assistance system can then assist a driver in driving out of the parking space again along the stored trajectory. The steering interventions in this case are effected autonomously by the vehicle, while the driver of the vehicle typically controls the longitudinal movement of the vehicle.

The present document is concerned with the technical object of increasing the convenience of a reversing assistance system and extending the scope of application of a reversing assistance system.

According to one aspect, a control unit for a reversing assistance system of a vehicle, in particular of a multitrack road motor vehicle, is described. The control unit is configured to determine and store reference data in regard to a first forward travel of the vehicle. In this case, the reference data indicate a reference trajectory of the vehicle for the first forward travel from an initial position to a first end position. The reference data can comprise position information (e.g. coordinates in a vehicle coordinate system) for a reference point on the vehicle on the reference trajectory. In addition, the reference data can comprise orientation information in regard to an orientation of the vehicle on the reference trajectory. The position information and the orientation information can be indicated if need be by curvature information in regard to a curvature of different segments of the reference trajectory. The reference point on the vehicle can be e.g. the middle of a rear axle of the vehicle. The reference data can therefore indicate the course of the reference point on the first forward travel as a reference trajectory.

The control unit is further configured to detect and determine that the vehicle begins a new, second forward travel at an intermediate position situated between the initial position and the first end position (in particular on the reference trajectory). By way of example, it is possible to detect that after a reverse travel a forward gear is selected again at the intermediate position in order to begin the second forward travel.

In particular, the control unit can be configured to determine that the vehicle has been conveyed from the first end position to the intermediate position during a reverse travel. The reverse travel may have been performed manually by a driver of the vehicle in this case. Alternatively, the reverse travel may have been performed with the assistance of the reversing assistance system. The driver may have stopped the vehicle at a particular position. The control unit can then determine a distance of the particular position of the vehicle from a position on the reference trajectory. It is then possible to take the distance as a basis for determining whether the vehicle is at an intermediate position on the reference trajectory at the beginning of the second forward travel. By way of example, it is possible to determine that the vehicle begins the second forward travel at an intermediate position on the reference trajectory if the second forward travel begins at a position that is 30 cm, 20 cm or less away from the reference trajectory.

The control unit is further configured to determine reference data in regard to the second forward travel of the vehicle, wherein the reference data indicate the reference trajectory of the vehicle for the second forward travel starting from the intermediate position. The second forward travel can lead the vehicle e.g. to a second end point.

Additionally, the control unit is configured to link the reference data for the reference trajectory for the second forward travel starting from the intermediate position to the reference data for the reference trajectory for the first forward travel from the initial position to the intermediate position and/or to store said reference data in connection with one another. In other words, the reference data for the second forward travel starting from the intermediate position can be linked to the reference data for the first forward travel to the intermediate position and/or can be stored in connection with one another. As such, a continuous and/or coherent reference trajectory can also be provided for a juxtaposition of forward travels, said reference trajectory being able to be used by a reversing assistance system to reverse the vehicle at least at times autonomously. Therefore, the convenience of a reversing assistance system can be increased and the scope of application of a reversing assistance system can be extended.

The control unit can be configured to store the reference data in a memory unit (in particular in a memory unit of the vehicle). The memory unit can comprise a ring memory that can be used to store the reference data for a rated distance of the reference trajectory (e.g. for 50 meters).

The reference data for the reference trajectory for the first forward travel from the intermediate position to the first end position can be overwritten with the reference data for the reference trajectory for the second forward travel starting from the intermediate position. As such, a reversing assistance system can access a continuous reference trajectory in the memory unit in a reliable and efficient manner.

The control unit can be configured to overwrite reference data for the initial position with reference data for a present position of the vehicle if a distance of the stored reference trajectory reaches the rated distance. As such, it is possible to ensure that the reference trajectory always indicates the most recently reached positions of the vehicle.

The control unit can be configured to control a steering apparatus of the vehicle on the basis of the reference data during a reverse travel of the vehicle in order to drive the vehicle to a reversing position on the reference trajectory between the initial position and the intermediate position after termination of the second forward travel. In particular, the control unit can be configured to take the reference data as a basis for determining a reversing trajectory to the reversing position. The steering apparatus of the vehicle can then be controlled on the basis of the reversing trajectory during the reverse travel of the vehicle. The transverse guidance of the vehicle during the reverse travel can therefore be performed autonomously by the control unit or by the reversing assistance system. On the other hand, the longitudinal guidance of the vehicle can continue to be performed by the driver of the vehicle.

In addition, the control unit can be configured to take the reference data as a basis for determining a coverage area of the vehicle during the first and second forward travels. The coverage area of the vehicle in this case indicates areas along the reference trajectory that have been covered by the vehicle. The reversing trajectory can then also be determined on the basis of the coverage area of the vehicle. In particular, the reversing trajectory can be determined such that the vehicle remains largely (e.g. 90% or more) within the coverage area during the reverse travel. As such, a safe reverse travel can be rendered possible.

According to a further aspect, a method for determining a reference trajectory for a reversing assistance system of a vehicle is described. The method comprises determining and storing reference data in regard to a first forward travel of the vehicle, wherein the reference data indicate the reference trajectory of the vehicle for the first forward travel from an initial position to a first end position.

The method further comprises detecting or determining that the vehicle begins a new, second forward travel at an intermediate position situated between the initial position and the first end position on the reference trajectory. Additionally, the method comprises determining reference data in regard to the second forward travel of the vehicle, wherein the reference data indicate the reference trajectory of the vehicle for the second forward travel starting from the intermediate position. The method further comprises linking and/or storing the reference data for the reference trajectory for the second forward travel starting from the intermediate position in connection with the reference data for the reference trajectory for the first forward travel from the initial position to the intermediate position. As such, a coherent reference trajectory can be provided.

The aspects described above have been described in connection with a reversing assistance system. However, it should be pointed out that the aspects described can be applied in an appropriate manner to driver assistance systems comprising automated transverse and/or longitudinal guidance of a vehicle. In particular, the aspects described are applicable to driver assistance systems for maneuvering a vehicle. In this case, in particular in the claims, the term "reversing assistance system" can be replaced by the term "driver assistance system", the term "forward travel" can be replaced by the term "reference travel", the term "reverse travel" can be replaced by the term "renewed travel" and/or the term "reversing trajectory" can be replaced by the term "travel trajectory".

Therefore, a control unit for a driver assistance system of a vehicle having automated transverse guidance and/or automated longitudinal guidance is described. The control unit is configured to determine and store reference data in regard to a first reference travel of the vehicle. In this case, the reference data indicate a reference trajectory of the vehicle for the first reference travel from an initial position to a first end position. Additionally, the control unit is configured to detect that the vehicle begins a new, second reference travel at an intermediate position situated between the initial position and the first end position on the reference trajectory. In this case, the first and second reference travels preferably have the same direction of travel.

The control unit is further configured to determine reference data in regard to the second reference travel of the vehicle, wherein the reference data indicate the reference trajectory of the vehicle for the second reference travel starting from the intermediate position. Additionally, the control unit is configured to link the reference data for the reference trajectory for the second reference travel starting from the intermediate position to the reference data for the reference trajectory for the first reference travel from the initial position to the intermediate position in order to provide a coherent reference trajectory for an assisted renewed travel.

In particular, the coherent reference trajectory can be taken as a basis for determining a travel trajectory for a renewed travel between the initial position and the second end position of the second reference travel. A steering apparatus of the vehicle can then be actuated on the basis of the travel trajectory in order to assist the driver of the vehicle during the renewed travel.

Therefore, a continuous and/or coherent reference trajectory can also be provided for a juxtaposition of reference travels, said reference trajectory being able to be used by a driver assistance system to drive the vehicle at least at times autonomously during a renewed travel. Therefore, the convenience of a driver assistance system can be increased and the scope of application of a driver assistance system can be extended.

According to a further aspect, a method for determining a reference trajectory for a driver assistance system of a vehicle having automated transverse guidance and/or longitudinal guidance is described. The method comprises determining and storing reference data in regard to a first reference travel of the vehicle, wherein the reference data indicate the reference trajectory of the vehicle for the first reference travel from an initial position to a first end position. Additionally, the method comprises detecting that the vehicle begins a new, second reference travel at an intermediate position situated between the initial position and the first end position on the reference trajectory. The method further comprises determining reference data in regard to the second reference travel of the vehicle, wherein the reference data indicate the reference trajectory of the vehicle for the second reference travel starting from the intermediate position. Additionally, the method comprises linking and/or storing the reference data for the reference trajectory for the second reference travel starting from the intermediate position to the reference data for the reference trajectory for the first reference travel from the initial position to the intermediate position in order to provide a coherent reference trajectory for an assisted renewed travel.

The first and second reference travels can preferably each be a forward travel (in the forward direction of the vehicle). Alternatively, the reference travels can each be reverse travels (in the reverse direction of the vehicle). The renewed travel can be a travel in the direction of the (second) end position or a travel in the direction of the initial position. In addition, the renewed travel can be a forward travel or a reverse travel. Preferably, the renewed travel is a reverse travel in the direction of the initial position.

In a further preferred example, the reference travels and the renewed travel are each a forward travel or alternatively each a reverse travel. As such, a vehicle can be taught a compound reference trajectory for a renewed travel in the same direction of travel.

The control unit can be configured so as, during the renewed travel, to take the travel trajectory as a basis for performing automated transverse guidance and automated longitudinal guidance. If need be, the control unit can receive a control signal from a remote control of the vehicle and then prompt the longitudinal guidance of the vehicle. As such, a user of the vehicle can control the longitudinal guidance of the vehicle by means of a remote control.

According to a further aspect, a multitrack vehicle (in particular a road motor vehicle, e.g. an automobile or a truck) is described that comprises a control unit described in this document.

According to a further aspect, a software (SW) program is described. The SW program can be configured to be executed on a processor (e.g. on a controller of a vehicle), and to thereby perform one of the methods described in this document.

According to a further aspect, a storage medium is described. The storage medium can comprise an SW program configured to be executed on a processor, and to thereby perform one of the methods described in this document.

It should be borne in mind that the methods, apparatuses and systems described in this document can be used either on their own or in combination with other methods, apparatuses and systems described in this document. In addition, any aspects of the methods, apparatuses and systems described in this document can be combined with one another in a wide variety of ways. In particular, the features of the claims can be combined with one another in a wide variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
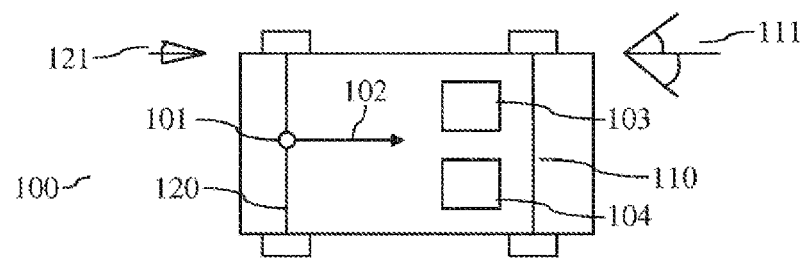
FIG. 1 shows an exemplary two-track vehicle.

As set out at the outset, the present document is concerned with the provision of a reference trajectory for a reverse maneuver. In this connection, FIG. 1 shows a block diagram of an exemplary multitrack, in particular two-track, vehicle 100. The vehicle 100 comprises a front axle 110 and a rear axle 120. In this case, a steering apparatus of the front axle 110 can be used to implement a particular front steering angle range 111. If need be, the vehicle 100 can have a rear-wheel steering apparatus that can be used to implement a particular rear steering angle range 121. Typically, the front steering angle range 111 is substantially larger than the rear steering angle range 121.

The text below describes the measures described in this document on the basis of a reversing assistance system in which reference travels for recording a coherent reference trajectory are effected in the forward direction and in which a renewed travel along a travel trajectory is effected in the reverse direction along a reversing trajectory. The described forward travels are therefore examples of general reference travels and the described reversing trajectory is an example of a general travel trajectory. In particular, the aspects described in this document:

(i) in regard to a first and a second forward travel apply generally to a first and a second reference travel (which if need be can in each case also be traveled in the reverse direction with a vehicle 100);
(ii) in regard to a reverse travel apply generally to a renewed travel (which if need be can also be traveled in the forward direction with a vehicle 100); and/or
(iii) in regard to a reversing trajectory apply generally to a travel trajectory (which if need be can also be traveled in the same direction as the reference trajectory during the reference travel).

Figure 2:
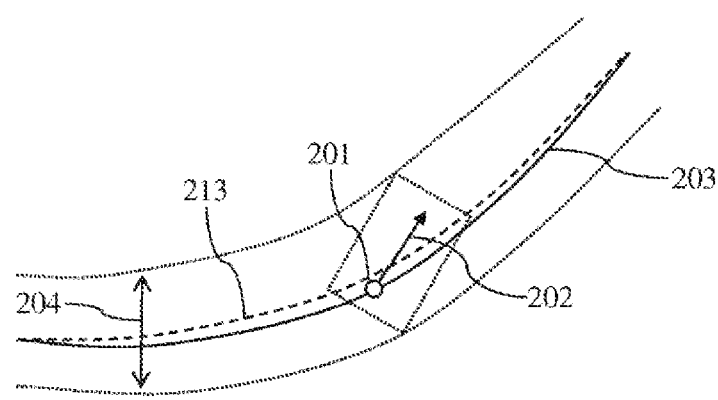
FIG. 2 shows an exemplary driving maneuver.

A user of the vehicle 100 can activate a reversing assistance system e.g. on entering a parking garage. In reaction thereto, a control unit 103 of the vehicle 100 detects a reference trajectory 203 during a forward travel (see FIG. 2) and stores it in a memory unit 104. Alternatively or additionally, the detection and storage of a reference trajectory 203 can be effected automatically if need be, e.g. when the speed of travel of the vehicle 100 is equal to or less than a speed threshold value (e.g. of 40 km/h). As such, the reference trajectory 203 can be provided even when the user did not initially have the intention to use the reversing assistant.

The memory unit 104 can be realized e.g. as a ring memory that can be used to store reference data in regard to a reference trajectory 203 for the last x meters of a forward travel (where x=30, 40, 50 or more). If the forward travel is longer than the rated distance of x meters, then the reference data in regard to the section of the reference trajectory 203 that is furthest behind in each case can be overwritten with reference data in regard to the present section of the reference trajectory 203.

The reference data for a reference trajectory 203 can comprise position information 201 in regard to a reference point 101 on the vehicle 100, the reference point 101 being able to correspond e.g. to the middle of the rear axle 120. The reference data in regard to the position of the reference point 101 can be determined at a particular sampling rate (e.g. every 10 cm, 5 cm or fewer), which means that the position information 201 for the position of the reference point 101 can be used for describing the course of the reference trajectory 203 during the forward travel of the vehicle 100 in a precise manner.

A vehicle 100 has a particular orientation 102 at a particular position on a forward travel. At one position, it is thus possible to determine orientation information 202 in regard to a rotation or alignment or orientation 102 of the vehicle 100 relative to the reference point 101. On the basis of the orientation information 202 at the multiplicity of positions on the reference trajectory 203, a coverage area 204, in particular an envelope, around the reference trajectory 203 can be determined (see FIG. 2) that indicates the area that a component (e.g. part of the bodywork) of the vehicle 100 was in during the forward travel. The coverage area 204 therefore indicates, on the assumption of static obstacles on the reference trajectory 203, the area in which the vehicle 100 can be driven along a reversing trajectory 213 without collision. In other words, the reversing trajectory 213 can be determined on the basis of the reference trajectory 203 such that the vehicle 100 remains within the coverage area 204 during the reverse travel along the reversing trajectory 213. As such, on the assumption of static obstacles, reversing without collision can be rendered possible.

The reference data for the reference trajectory 203 determined during the forward travel can therefore comprise, for each of a multiplicity of positions on the reference trajectory 203, position information 201 indicating the position of the reference point 101 on the vehicle 100 (e.g. in a Cartesian coordinate system relative to the initial position on the reference trajectory 203). In addition, the reference data can indicate, for each of the multiplicity of positions, orientation information 201 in regard to an orientation 102 of the vehicle 100 at the respective position. As such, the reference trajectory 203 and the coverage area 204 of the vehicle 100 on a forward travel can be described in a precise manner.

Alternatively or additionally, the reference data can comprise, for trajectory segments between a multiplicity of positions, curvature information in regard to a curvature of the respective trajectory segment. The reference trajectory 203 can then be described by a sequence of curvature values. In addition, interpolation of the sequence of curvature values allows a course of the reference trajectory 203 to be determined (e.g. by means of the use of clothoids). From the curvature values, it is also possible to determine the coverage area 204 of the vehicle during the forward travel on the reference trajectory 203.

The reference data can therefore describe a reference trajectory 203 and a coverage area 204 of a vehicle 100 during a forward travel in different ways. If it is detected that the driver of the vehicle 100 selects a reverse gear and/or if the user of the vehicle 100 uses a user interface to activate the reversing assistance system, the reference data can be taken as a basis for determining a reversing trajectory 213 for assisted reversing of the vehicle 100 to the starting point of the reference trajectory 203. In this case, the reference trajectory 203 can be determined such that the vehicle 100:
  (i) reaches the starting point of the reference trajectory 203; and/or
  (ii) remains within the coverage area 204 as largely as possible.

The determined reversing trajectory 213 can indicate in particular a steering angle of the steering apparatus of the front axle 110 of the vehicle 100 as a function of the position on the reversing trajectory 213. The driver of the vehicle 100 can then take the determined reversing trajectory 213 as a basis for being assisted during the reverse travel. In particular, the steering apparatus of the vehicle 100 can be actuated automatically on the basis of the reversing trajectory 213, in order to undertake the transverse guidance of the vehicle 100. On the other hand, the longitudinal guidance of the vehicle 100, in particular the stipulation of the longitudinal speed and the direction of travel (forward or backward) of the vehicle 100, can continue to be performed by the driver. The provision of such a reversing assistant allows a driver of a vehicle 100 to reverse out of a confined traffic situation (e.g. in a cramped parking garage) in a convenient manner.

Figure 3:
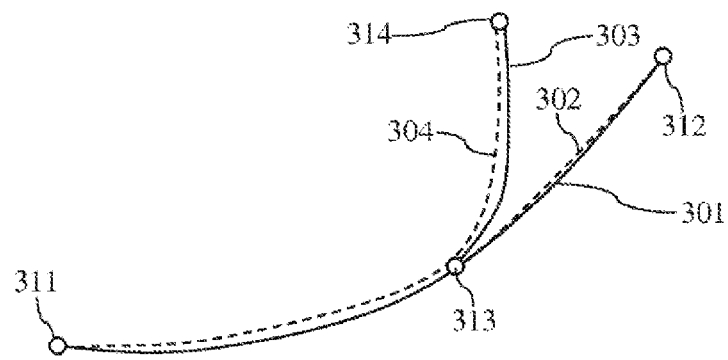
FIG. 3 shows the exemplary adaptation of a reference trajectory during a driving maneuver with multiple moves.

In the course of a forward travel, a vehicle 100 can be driven to an end position in multiple partial moves. In this case, at least some of the partial moves can comprise a forward travel of the vehicle 100. FIG. 3 shows an exemplary travel of a vehicle 100 in which the vehicle 100 is driven in the forward direction, manually by a driver of the vehicle 100, along a first trajectory 301 starting from an initial position 311 to a first end position 312. The vehicle can then be driven back along a second trajectory 302 in the reverse direction to an intermediate position 313 on the first trajectory 301, e.g. because a driver has not found a parking space at the first end position 312. The driving in the reverse direction can be effected manually by the driver of the vehicle 100 or with the assistance of a reversing assistance system in this case. Starting from the intermediate position 313, the vehicle 100 can then be driven, manually by the driver of the vehicle 100, along a third trajectory 303 in the forward direction to a second end position 314.

The control unit 103 of the vehicle 100 can be designed such that, starting from the initial position 311, reference data for a reference trajectory 203 for the forward travel along the first trajectory 301 to the first end position 312 are determined and stored in the memory unit 104. The control unit 103 can then determine a reversing trajectory 213 for the reference trajectory 203, which can be used to drive the vehicle 100 to the initial position 311 again.

When the intermediate position 313 is reached, the driver can stop the vehicle 100 and select a forward gear again. Selecting the forward gear could cause the reference data for the reference trajectory 203 starting from the initial position 311 to be erased, and new reference data for the third trajectory 303 starting from the intermediate position 313 to be captured and stored. However, this has the disadvantage that in that case only a reversing trajectory 213 starting from the second end position 314 to the intermediate position 313 can be determined. Assistance for the driver during the travel on a fourth trajectory 304, which leads the vehicle 100 from the second end position 314 to the initial position 311, is then no longer possible.

The control unit 103 of the vehicle 100 can thus preferably be configured to detect that the intermediate position 313, at which the driver of the vehicle 100 changes from a reverse gear to a forward gear, is on an already stored reference trajectory 203. In addition, the reference data for the reference trajectory 203 between the intermediate position 313 and the first end position 312 can be erased. The reference data for the first section of the reference trajectory 203 between the initial position 311 and the intermediate position 313 can continue to be stored.

Additionally, during the second forward travel along the third trajectory 303 starting from the intermediate position 313, reference data in regard to a second section of the reference trajectory 203 between the intermediate position 313 and the second end position 314 can be captured and stored. The memory unit 104 can therefore be used to store reference data in regard to the first section and in regard to the directly subsequent second section of a reference trajectory 203. The stored reference data can then be used to assist the vehicle 100 during a reverse travel from the second end position 314 to the initial position 311. In particular, the stored reference data can be taken as a basis for determining a reversing trajectory 213 from the second end position 314 to the initial position 311, and said reversing trajectory can be used for a reversing assistance system.

Figure 4:
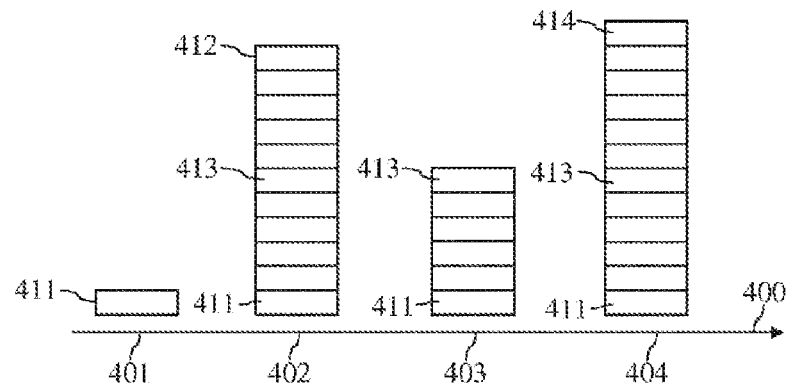
FIG. 4 shows exemplary memory entries for a reference trajectory.

FIG. 4 illustrates data records that can be stored in the memory unit 104 during performance of the driving maneuver shown in FIG. 3. On activation 401 of the reversing assistance function at the initial position 311, an initial data record 411 can be determined that indicates the reference trajectory 203 and/or the coverage area 204 at the initial position 311. In the course of the forward travel 402, further data records 413, 412 can then be captured and stored for different positions and/or for different segments of the reference trajectory 203. In particular, an intermediate data record 413 for the intermediate position 313 and an end data record 412 for the first end position 312 can be determined and stored.

The vehicle 100 can then be driven by the driver and/or by the reversing assistance system to the intermediate position 313 in the reverse direction. On selection 403 of the forward gear, the data records 412 for the reference trajectory 203 between intermediate position 313 and first end position 312 can be erased. On the other hand, the data records 411, 413 for the reference trajectory 203 between initial position 311 and intermediate position 313 can remain stored in the memory unit 104. During forward travel 404 to the second end position 314, data records 414 can then be appended to the already stored data records 411, 413 in order to describe the second section of the reference trajectory 203.

Therefore, trajectory extension of an already stored reference trajectory 203, i.e. an already recorded route, is rendered possible. As set out in FIG. 3, the vehicle 100 can mark the starting point 311 and store it as reference data. The vehicle 100 can then make a first move (along a first trajectory 301) traveling forward and reference data for the first move can be stored. The second move (along the second trajectory 302) is made traveling in reverse (if need be with transverse guidance by the vehicle 100) and therefore only the difference trajectory comprising the trajectory of the first move minus the trajectory of the second move can then be traveled along.

The vehicle 100 then makes a third move (along the third trajectory 303) traveling forward and stores it as reference trajectory 203. Combination of the trajectories of the third move and of the first part of the first move results in a reference trajectory 203 between a starting point 311 and an end point 314 that can be traveled along in the course of a fourth move along the reversing trajectory 304 even though the driver of the vehicle 100 has not traveled along this trajectory a little way forward.

Figure 5:
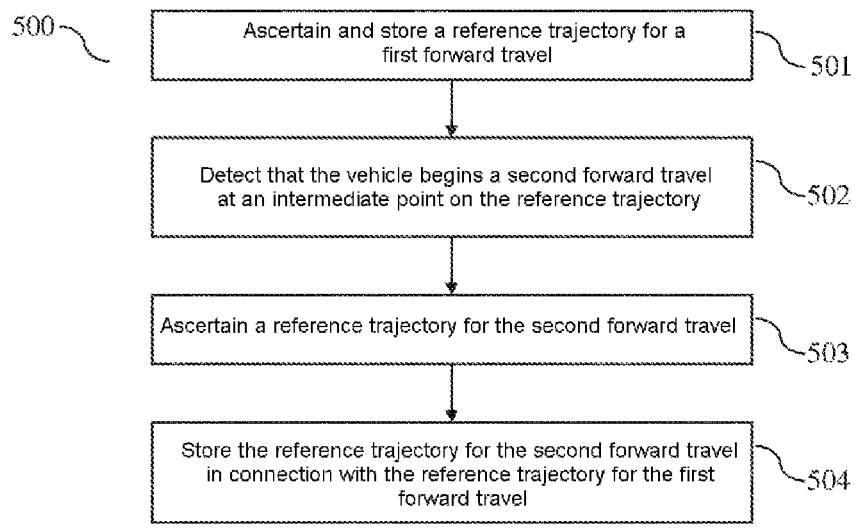
FIG. 5 is a flowchart for an exemplary method for determining a reference trajectory for a reverse maneuver.

FIG. 5 shows a flowchart for an exemplary method 500 for determining a reference trajectory 203 for a reversing assistance system of a vehicle 100. The reference trajectory 203 can be used in particular by the reversing assistance system to drive the vehicle 100 at least at times autonomously during a reverse travel. The method 500 comprises determining and storing 501 reference data in regard to a first forward travel of the vehicle 100. In this case, the reference data indicate the reference trajectory 203 of the vehicle 100 for the first forward travel from an initial position 311 of the first forward travel to a first end position 312 of the first forward travel. Typically, the distance of a forward travel that can be stored is restricted to a rated distance. Consequently, the initial position 311 does not necessarily correspond to the position at which the first forward travel began. The initial position 311 can generally be a position situated on the reference trajectory 203 of the first forward travel before the first end position 312.

The method 500 further comprises detecting 502 that the vehicle 100 begins a new, second forward travel at an intermediate position 313 situated between the initial position 311 and the first end position 312 on the reference trajectory 203. In particular, the vehicle 100 may have been reversed to the intermediate position 313. At the intermediate position 313, the driver of the vehicle 100 may then have selected a forward gear again in order to begin the second forward travel.

Additionally, the method 500 comprises determining 503 reference data in regard to the second forward travel of the vehicle 100. In this case, the reference data indicate the reference trajectory 203 of the vehicle 100 for the second forward travel starting from the intermediate position 313. The vehicle 100 can be driven to a second end position 314 during the second forward travel.

The method 500 further comprises storing 504 the reference data for the reference trajectory 203 for the second forward travel starting from the intermediate position 313 in connection with the reference data for the reference trajectory 203 for the first forward travel from the initial position 311 to the intermediate position 313. In particular, the reference data for the second forward travel from the intermediate position 313 can be appended to the reference data for the first forward travel to the intermediate position 313 in order to provide a continuous reference trajectory 203 from the initial position 311 via the intermediate position 313 to the second end position 314. This reference trajectory 203 can then be used by the reversing assistance system to at least at times reverse back the vehicle 100 to the initial position 311.

The juxtaposition of reference trajectories 203 allows the scope of application for a reversing assistance system to be increased. As such, the convenience of a user of a vehicle 100 can be increased.

The present invention is not restricted to the exemplary embodiments shown. In particular, it should be borne in mind that the description and the figures are intended to illustrate only the principle of the proposed methods, apparatuses and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for a reversing assistance system of a vehicle, comprising:
 a control unit operatively configured to:
 determine and store first reference data in regard to a first forward travel of the vehicle, wherein the first reference data include a first reference trajectory of the vehicle for the first forward travel from an initial position to a first end position;
 detect that the vehicle begins a new, second forward travel at an intermediate position situated between the initial position and the first end position on the first reference trajectory;
 determine second reference data in regard to the second forward travel of the vehicle, wherein the second reference data include a second reference trajectory of the vehicle for the second forward travel starting from the intermediate position and ending at a second end position, wherein the second end position is different from the first end position; and
 link the second reference data for the second reference trajectory for the second forward travel starting from the intermediate position and ending at the second end position to the first reference data for the first reference trajectory for the first forward travel from the initial position to the intermediate position in order to provide a coherent reference trajectory for an assisted reverse travel from the second end position to the initial position.

2. The control unit as claimed in claim 1, wherein the control unit is further operatively configured to:
 store the first reference data and the second reference data in a memory unit; and
 overwrite the first reference data for the first reference trajectory for the first forward travel from the intermediate position to the first end position with the second reference data for the second reference trajectory for the second forward travel starting from the intermediate position.

3. The control unit as claimed in claim 2, wherein the control unit is further operatively configured to:

store reference data for a rated distance of a reference trajectory; and overwrite the first reference data for the initial position with reference data for a present position of the vehicle if a distance of the reference trajectory reaches the rated distance.

4. The control unit as claimed in claim 1, wherein the control unit is further operatively configured to determine that the vehicle has been conveyed from the first end position to the intermediate position during a reverse travel.

5. The control unit as claimed in claim 1, wherein the control unit is further operatively configured to:
determine a distance of a reference point of the vehicle from the intermediate position; and
take the distance as a basis for determining whether the vehicle is at the intermediate position at the beginning of the second forward travel.

6. The control unit as claimed in claim 1, wherein the control unit is further operatively configured to control a steering apparatus of the vehicle on the basis of the first reference data during a reverse travel of the vehicle in order to drive the vehicle to a reversing position on the reference trajectory between the initial position and the intermediate position after termination of the second forward travel.

7. The control unit as claimed in claim 6, wherein the control unit is further operatively configured to:
take the first reference data as a basis for determining a reversing trajectory to the reversing position; and
control the steering apparatus of the vehicle on the basis of the reversing trajectory during the reverse travel of the vehicle.

8. The control unit as claimed in claim 7, wherein the control unit is further operatively configured to:
take the reference data as a basis for determining a coverage area of the vehicle during the first and second forward travels; and
determine the reversing trajectory also on the basis of the coverage area of the vehicle.

9. The control unit as claimed in claim 1, wherein the reference data comprise:
position information in regard to a multiplicity of positions on the reference trajectory; and
orientation information in regard to an orientation of the vehicle at the multiplicity of positions.

10. A method for determining a reference trajectory for a reversing assistance system of a vehicle, wherein the method comprises the steps of:
determining and storing first reference data in regard to a first forward travel of the vehicle, wherein the first reference data include a first reference trajectory of the vehicle for the first forward travel from an initial position to a first end position;
detecting that the vehicle begins a new, second forward travel at an intermediate position situated between the initial position and the first end position on the first reference trajectory;
determining second reference data in regard to the second forward travel of the vehicle, wherein the second reference data include a second reference trajectory of the vehicle for the second forward travel starting from the intermediate position and ending at a second end position, wherein the second end position is different from the first end position; and
linking the second reference data for the second reference trajectory for the second forward travel starting from the intermediate position and ending at the second end position to the first reference data for the first reference trajectory for the first forward travel from the initial position to the intermediate position in order to provide a coherent reference trajectory for an assisted reverse travel from the second end position to the initial position.

11. A control unit for a driver assistance system of a vehicle having automated transverse guidance and/or automated longitudinal guidance, comprising:
a control unit configured to:
determine and store first reference data in regard to a first reference travel of the vehicle; wherein the first reference data include a first reference trajectory of the vehicle for the first reference travel from an initial position to a first end position;
detect that the vehicle begins a new, second reference travel at an intermediate position situated between the initial position and the first end position on the first reference trajectory;
determine second reference data in regard to the second reference travel of the vehicle; wherein the second reference data include a second reference trajectory of the vehicle for the second reference travel starting from the intermediate position and ending at a second end position, wherein the second end position is different from the first end position; and
link the second reference data for the second reference trajectory for the second reference travel starting from the intermediate position and ending at the second end position to the first reference data for the first reference trajectory for the first reference travel from the initial position to the intermediate position in order to provide a coherent reference trajectory for an assisted renewed travel from the second end position to the initial position.

12. A method for determining a reference trajectory for a driver assistance system of a vehicle having automated transverse guidance and/or longitudinal guidance, wherein the method comprises the steps of:
determining and storing first reference data in regard to a first reference travel of the vehicle; wherein the first reference data include a first reference trajectory of the vehicle for the first reference travel from an initial position to a first end position;
detecting that the vehicle begins a new, second reference travel at an intermediate position situated between the initial position and the first end position on the reference trajectory;
determining second reference data in regard to the second reference travel of the vehicle; wherein the second reference data include a second reference trajectory of the vehicle for the second reference travel starting from the intermediate position and ending at a second end position, wherein the second end position is different from the first end position; and
linking the second reference data for the second reference trajectory for the second reference travel starting from the intermediate position and ending at the second end position to the first reference data for the first reference trajectory for the first reference travel from the initial position to the intermediate position in order to provide a coherent reference trajectory for an assisted renewed travel from the second end position to the initial position.

\* \* \* \* \*